Patented Aug. 31, 1948

2,448,015

UNITED STATES PATENT OFFICE 2,448,015

CRACKING OF HYDROCARBONS

Robert E. Burk, Cleveland Heights, Ohio, assignor to The Standard Oil Company, Cleveland, Ohio, a corporation of Ohio No Drawing. Application December 12, 1942, Serial No. 468,813

1 Claim. (Cl. 196—52)

This invention relates to the cracking of hydrocarbons utilizing a catalyst comprising a mixture of hydrogen fluoride and boron trifluoride. The word "cracking" as used herein is intended to cover the ordinary simple cracking process in which the hydrocarbons produced by the cracking are not subjected to further chemical modifications in the process.

Hydrogen fluoride has been known to exert a catalytic action in certain processes involving reactions of hydrocarbons, such as alkylations, but hydrogen fluoride as such is not a catalyst for cracking. Boron trifluoride also has been proposed as a catalyst for certain reactions, but it too when used by itself does not possess a catalytic activity for cracking.

Contrary to what might have been expected from a consideration of the individual properties of these fluorides with respect to cracking, I have discovered that a mixture of hydrogen fluoride and boron trifluoride is a very active and effective cracking catalyst.

Accordingly, it is an object of my invention to crack hydrocarbons under appropriate temperature and pressure conditions with a catalyst comprising both hydrogen fluoride and boron trifluoride.

The use of the novel catalyst for cracking is particularly advantageous in that the extent and nature of the activity may be varied and controlled by altering the proportions of hydrogen fluoride and boron trifluoride. This control, when used in connection with variations in temperature and pressure, permits a wide range of operations and results. It also adapts my cracking process to a large number of raw materials to be cracked, and makes it possible to produce a wide variety of cracked products.

The catalyst to be employed in accordance with the invention may be a mixture of the fluorides in any of a wide range of proportions. Preferably, the amount of hydrogen fluoride is in excess of the amount of boron trifluoride and in such a case the catalyst may be regarded as hydrogen fluoride promoted with boron trifluoride.

Hydrogen fluoride boils at 67° F. and therefore may readily exist in a liquid or gaseous phase depending on the temperature and pressure. It is thus admirably suited for either a liquid or vapor phase cracking process. Boron trifluoride has a boiling point of —150° F. and therefore exists as a gas at the temperatures usually encountered. However, it may be dissolved in the liquid hydrogen fluoride and thus the mixture may exist and be used in either the liquid or gaseous phase. The relative proportions of the two fluorides in the catalyst can be readily determined by measuring the partial pressure of the boron trifluoride in the mixture, and the amount present during a cracking process may be controlled in the same way.

The relative proportions of the hydrogen fluoride and the boron trifluoride in the catalyst may be varied over a wide range depending on the rate of reaction desired, temperature, pressure, stock being treated, products wanted, etc. The inter-relation of these factors is well understood in the cracking art. In general, the higher the proportion of boron trifluoride present as a promoter, the greater will be the cracking activity of the catalyst, and an efficient operation on a commercial scale will generally require a substantial amount. In a preferred embodiment of my invention, the amount of boron trifluoride may vary from ½ to 50% of the amount of hydrogen fluoride on a molal basis regarding hydrogen fluoride as HF and boron trifluoride as $BF_3$.

The amount of the catalyst used may vary over a wide range depending upon the temperature and pressure conditions, the stock being treated, the products wanted, etc., as will be understood by those skilled in the cracking art. In general the range will be 5 to 300% of the hydrocarbon to be cracked.

The hydrocarbons that may be cracked in accordance with the process comprise primarily those of the aliphatic paraffin series and generally the cracking is applied to paraffin hydrocarbons of six or more carbon atoms. The cracking process, however, may also be applied to ring compounds having one or more crackable side chains, to cycloparaffins, or to mixtures of any of the above.

Because of the tendency of the catalyst to form a complex or a loose chemical combination with aromatics, or to be absorbed by them, the catalytic cracking process of the invention is readily adapted to hydrocarbons low in aromatics. However, if larger amounts of the catalyst are used, so that there is an excess of the catalyst to be effective for cracking the unabsorbed paraffin hydrocarbons, the process may be used directly with aromatic containing hydrocarbons, and cracking of the side chains on the aromatics, if any, accomplished simultaneously with the cracking of the paraffins.

If desired an aromatic containing hydrocarbon may be dearomatized and/or unsaturated components removed by extraction with selective solvents or by any other process. Alternatively such hydrocarbons may be treated first with the catalyst in liquid form at a low temperature, to remove the aromatics as a separate fraction, as described in my earlier filed copending application Serial No. 423,303, filed December 17, 1941, Patent Number 2,343,744. The dearomatized hydrocarbon may then be cracked with the catalyst. The aromatics may have any side chains cracked or may be recovered from the separated fraction and cracked or otherwise treated or utilized.

After the cracking operation the catalyst may be recovered by stratification if a liquid phase operation is used, or by absorption or reaction with various chemicals as the economics and the needs of the particular process dictate.

When the process is applied to cracking in the liquid phase, a temperature of from −10° to +450° F. may be used, ambient temperatures being preferred because of convenience. The pressure may vary from atmospheric pressure to at least 1000 pounds per square inch. When higher temperatures are used in a liquid phase operation it will be understood that sufficient pressure must be used to keep the hydrocarbon to be cracked and the catalyst in a liquid phase.

When the process is applied to cracking in the vapor phase the temperatures preferred are within the range of 100 to 900° F. and pressures used may vary from atmospheric to at least 1000 pounds per square inch.

The catalyst is also adapted for a combination liquid-vapor phase cracking process in which the hydrocarbon to be cracked is in the liquid phase and the catalyst is in the vapor phase, and may, for example, be passed countercurrent under appropriate conditions of temperature and pressure to maintain the hydrocarbon and catalyst in these phases.

In either liquid or vapor phase cracking, the temperature and pressure to be selected will depend in part upon the amount of catalyst and the relative proportions of the fluorides it is decided to use, and upon the stock to be cracked and the products wanted. The economics involved in each of the factors must also be considered in a commercial operation. Cracking processes using catalysts are well understood in the petroleum art, and the various techniques, procedures, the conditions of operation and types of apparatus used therein are well known and so diverse as to make it unnecessary and impractical to describe them in infinite detail in order that a person skilled in the art may successfully practice my process.

The following example is given merely as illustrative of the desirable results that may be obtained in accordance with the process, and not as a limitation on the above defined scope of the invention, nor as an attempt to illustrate the diversity of the application of my process. In accordance with this example a dearomatized Pennsylvania kerosene was subjected at a pressure of 185 pounds per square inch total pressure at a temperature of 90° F. to a treatment with 89% by volume of hydrogen fluoride containing boron trifluoride in an amount to yield a partial pressure of 150 pounds per square inch. After treatment for about two hours, two layers separated, the upper yielding about 30 per cent gasoline (based on the kerosene cracked), about 34 percent isobutane and less than 2.5% normal butane, propane and products of less than 3 carbon atoms. The product in the lower layer, upon separation from the catalyst, was a drying oil capable of drying to a hard finish. It will be seen that my process results in a good yield of particularly valuable products, namely gasoline and isobutane, and that the unsaturates formed are readily utilizable.

Further illustrative examples show that at higher temperatures the yields of gasoline are somewhat lower and an appreciable amount of propane and normal butane are also formed. Lower temperatures give increased yields of gasoline and a smaller amount of isobutane and also smaller amounts of products in the lower layer with the catalyst.

This application is a continuation-in-part of my co-pending application Serial No. 423,073, filed December 15, 1941.

From the above description it will be seen that my process is subject to many variations and embodiments and I intend all of the same to be included within my invention as one within the following claim:

I claim:

The process of catalytically cracking hydrocarbons, which comprises treating kerosene with a liquid catalyst the inorganic constituents of which comprise primarily about 89 volume per cent of hydrogen fluoride (based on the kerosene) promoted by an amount of boron trifluoride dissolved therein to provide a partial pressure of boron trifluoride of about 150 pounds per square inch, at a temperature of about 90° F., and at a pressure at least sufficient to maintain the hydrogen fluoride in the liquid phase at said temperature, and continuing the treatment for a period of time under the above conditions such that cracking of the kerosene to produce a substantial amount of gasoline and lower hydrocarbons is the principal reaction.

ROBERT E. BURK.

REFERENCES CITED

The following references are of record in the file of this patent:

UNITED STATES PATENTS

| Number | Name | Date |
|---|---|---|
| 2,172,146 | Ruthruff | Sept. 5, 1939 |
| 2,216,274 | Grosse | Oct. 1, 1942 |
| 2,320,629 | Matuszak | June 1, 1943 |
| 2,337,432 | Veltman | Dec. 21, 1943 |
| 2,344,789 | Schmerling | Mar. 21, 1944 |
| 2,357,495 | Bloch | Sept. 5, 1944 |

FOREIGN PATENTS

| Number | Country | Date |
|---|---|---|
| 292,932 | Great Britain | May 23, 1929 |

OTHER REFERENCES

Sachanen, "Conversion of Petroleum," 1940 Reinhold Pub. Corp., New York, pages 198–199.